United States Patent [19]

Sanders et al.

[11] Patent Number: 5,118,189
[45] Date of Patent: Jun. 2, 1992

[54] PASSIVE RING RESONATOR GYROSCOPE

[75] Inventors: Virgil E. Sanders, Laguna Hills;
Timothy J. Valle, Long Beach; Kie L. SooHoo, Anaheim, all of Calif.

[73] Assignee: Rockwell International Corporation, El Segundo, Calif.

[21] Appl. No.: 676,322

[22] Filed: Nov. 29, 1984

[51] Int. Cl.$^5$ ............................................. G01C 19/64
[52] U.S. Cl. ....................................... 356/350; 372/94
[58] Field of Search ................... 356/350; 372/94, 97, 372/32

[56] References Cited

U.S. PATENT DOCUMENTS

| | | | |
|---|---|---|---|
| 3,486,131 | 12/1969 | Smith | 372/32 |
| 4,035,081 | 7/1977 | Sepp et al. | 356/350 |
| 4,477,188 | 10/1984 | Stiles et al. | 356/350 |
| 4,514,088 | 4/1985 | Coccoli | 356/350 |

OTHER PUBLICATIONS

"Passive Ring Resonator Laser Gyroscope", Ezekiel et al., Applied Physics Letters, vol. 30, No. 9, 5-1977, pp. 478-480.
"Passive Ring Resonator Method for Sensitive Inertial Rotation Measurements in Geophysics and Relativity", Sanders et al., Optics Letters, 11-1981, pp. 569-571.

*Primary Examiner*—Davis L. Willis
*Assistant Examiner*—S. A. Turner
*Attorney, Agent, or Firm*—H. Fredrick Hamann; George A. Montanye; James F. Kirk

[57] ABSTRACT

A passive ring resonator gyroscope comprising a single piece body having an integral first and second resonator cavity. The first resonator cavity has a single frequency laser means with internal cavity mounted reflective surfaces to provide a single frequency light source to the second resonator cavity. The single frequency light source is sharply tuned. The second resonator cavity is a passive high Q evacuated cavity having a closed second optical path tuned to resonate at the single frequency light frequency of the first resonator cavity. A cavity servo means is provided for controlling the resonant frequency of the second resonator high Q cavity to simultaneously and substantially track the resonant frequency of the first resonator high Q cavity. An output servo means is provided for detecting the change in frequency of the single frequency light within the second resonator in response to said body rate input to the sensitive axis and for providing an output signal.

15 Claims, 7 Drawing Sheets

PASSIVE RING RESONATOR GYROSCOPE

BACKGROUND OF THE INVENTION

1. Field of the Invention

The present invention relates to optical gyroscopes and more particularly to passive ring resonator gyroscopes; these have bias frequency errors resulting from mechanically or thermally induced dimensional changes that influence tuning.

2. Description of Prior Art

In a passive ring resonator gyroscope, a pair of monochromatic light beams counterpropagate about closed-loop optical paths, where the paths form a resonator. The stability of the path length between reflective surfaces forming the closed path is critical in maintaining resonance in the passive ring resonator cavity since dimensional changes contribute to bias frequency errors. The relationship between a linear laser[1] and a ring resonator to form a prior art passive ring resonator gyro is depicted in an article by S. EZEKIEL and S. R. BALSAMO titled "A Passive Ring Laser Gyroscope", *Applied Physics Letters*, Vol. 30, No. 9, May 1, 1977, pg. 478-480. (NOTE: Usually a resonator is conceived as a linear or standing wave resonator in which the light completes an optical round trip by reflecting off a mirror and retracing its path. These forward and backward waves create a standing wave in the cavity. In a ring resonator, the light completes an optical round trip without retracing its path and hence the path encloses an area as shown in Ezekiel's paper.)

[1] For description of lasers and resonators refer to: Yariv, A., QUANTUM ELECTRONICS (John Wiley & Sons, 1975) or Sargent, M., et. al., LASER PHYSICS (Addison-Wesley Pub., 1974).

In the passive ring resonator, such as that described in the EZEKIEL reference, the two beams, traveling in opposite directions around the closed-loop optical path, are injected into the passive ring resonator from a single frequency light source. As the ring resonator gyroscope cavity rotates in inertial space, the two counterpropagating beams travel unequal path lengths. This path difference, due to rotation in inertial space, gives rise to a relative frequency difference (Sagnac effect[2]) between the two counterpropagating beams. (NOTE: A ring resonator, as opposed to a linear resonator, can exhibit the Sagnac effect and detect inertial rotation.)

[2] E. J. Post, "Sagnac Effect", *Review of Modern Physics*, Vol. 39, No. 2, April 1967, p. 475-493.

The relative frequency difference is detected as an electrical beat signal which is then electronically interpreted to indicate the direction and inertial rate of rotation of the passive gyro about the gyro's sensitive axis. The sensitive axis of the gyro is along the direction normal to the plane of the passive resonator.

The single frequency light source for the passive resonator is typically an external linear laser. Spectra Physics Inc. of Sunnyvale, Calif. produces stabilized lasers with the required characteristics.

It is known that bias errors in the detected signal of a ring resonator gyro result from dimensional changes in the laser and in the passive ring resonator. Bias errors also result from Fresnel Drag; these errors arise from the presence of gases (e.g. air) in the path of the counterpropagating beams in the resonator. Bias errors are typically characterized as a frequency difference between the two beams which is not related to the rotation rate. Bias errors are sometimes detected as a frequency difference in the absence of rotation or as post calibration changes in the frequency difference for a specific absolute inertial rotation rate.

The Passive Ring Resonator Gyroscope of the type described in the EZEKIEL reference is typically constructed by placing optical elements, such as mirrors, beamsplitters, etc. on an optical bench. The location, spacing and geometrical relationships between the elements of the gyro function to enhance the passive ring resonator gyroscope's sensitivity and stability. Experimental passive ring resonator gyroscopes typically have path lengths of a few meters making them unsuitable for use as a navigational instrument. The large size of prior art passive ring resonator gyroscopes, such as that characterized in the EZEKIEL reference, also contributes to the likelihood of bias errors due to mechanical coupling and mechanical drift of the optical elements in response to physical and thermal forces acting on the laser and on the optical table or bench.

SUMMARY OF THE INVENTION

The objective of this invention is to provide a passive ring resonator gyro having reduced bias errors and bias error sensitivity while having enhanced stability and sensitivity. This is accomplished by having complete linear and ring resonators constructed from one body.

A particular embodiment of this innovative passive ring resonator gyroscope has a single piece body 12, typically fabricated from a block of glass ceramic material such as ZERODUR ™, (a trademark of the JENA[ER] the GLASSWERK SCHOTT & GEN. of MAINZ, GERMANY), which forms a fixed reference frame for all required optical elements, including the integral first and second resonator cavities 14, 16. The first cavity, when operated with suitable excitation, functions as a linear laser providing a source of single mode $TEM_{oo}$, single frequency light for the second resonator cavity. The second resonator cavity 16 and its reflective elements form a passive high Q cavity having a closed second optical path tuned to resonate at the frequency of the first resonator cavity. A means for coupling the single frequency light from the first to the second resonator cavity is implemented using conventional mirrors, lenses and beamsplitters.

The significant feature of this passive ring resonator gyroscope is that the second resonator cavity is oriented and dimensioned in relation to the first resonator cavity to have substantially equivalent optical path length changes in response to any induced body dimensional changes. Furthermore, the fixed relationship of the linear laser and the passive ring resonator eliminates beam misalignment caused by the relative motion of the two resonators. Bias errors are diminished since the ring resonator is a passive device and has no internal excitation to frequency shift the cavity resonances. Bias errors are further diminished by the evacuation of the second resonator since there will be no effect due to Fresnel drag. Taken together, these features form a gyroscope with increased stability and reduced bias errors.

A servo means is provided for controlling the resonant frequency of the second resonator high Q cavity to track the resonant frequency of the first resonator high Q cavity.

This particular embodiment also provides an output servo means for detecting changes in the frequency of the single frequency light within the second resonator in response to an input body rate about the sensitive axis of the gyro.

In a more particular alternative embodiment, the linear laser, first resonator cavity 14 has transmitting optical ports 20, 21 for transmitting stabilized single frequency light. The internal body-mounted reflective surfaces 24, 26, 25 are coupled to and mechanically spaced by the body 12. A gain medium, such as a Helium Neon gas mixture is contained in the first resonator cavity.

A means for exciting this gain medium to induce lasing in the first resonator cavity is provided. The single frequency light source is directed through at least one transmitting optical port of the first resonator.

A servo means using phase sensitive detection techniques provides a path length control signal to frequency stabilize the linear laser to its intensity maximum.

In yet another more particular embodiment of the passive ring resonator gyroscope 10, the single frequency light source is further characterized to provide the second cavity with a clockwise (CW) beam and a counterclockwise (CCW) beam. In this embodiment, the second servo loop means is further characterized to adjust the second cavity's path length to compensate for the input body rate by constantly maximizing the clockwise beam's output.

In this embodiment, the output servo means is also characterized to adjust the frequency of the counterclockwise beam to maximize the output of the counterclockwise beam. This servo compensates for the effect of input body rate on the CCW beam and the effect of the CW servo on the second cavity.

In this more particular embodiment, a means for detecting the frequency difference between the clockwise and the counterclockwise beams provides a signal representing a measure of the input body rate.

DESCRIPTION OF THE PREFERRED EMBODIMENT

Figure 1:
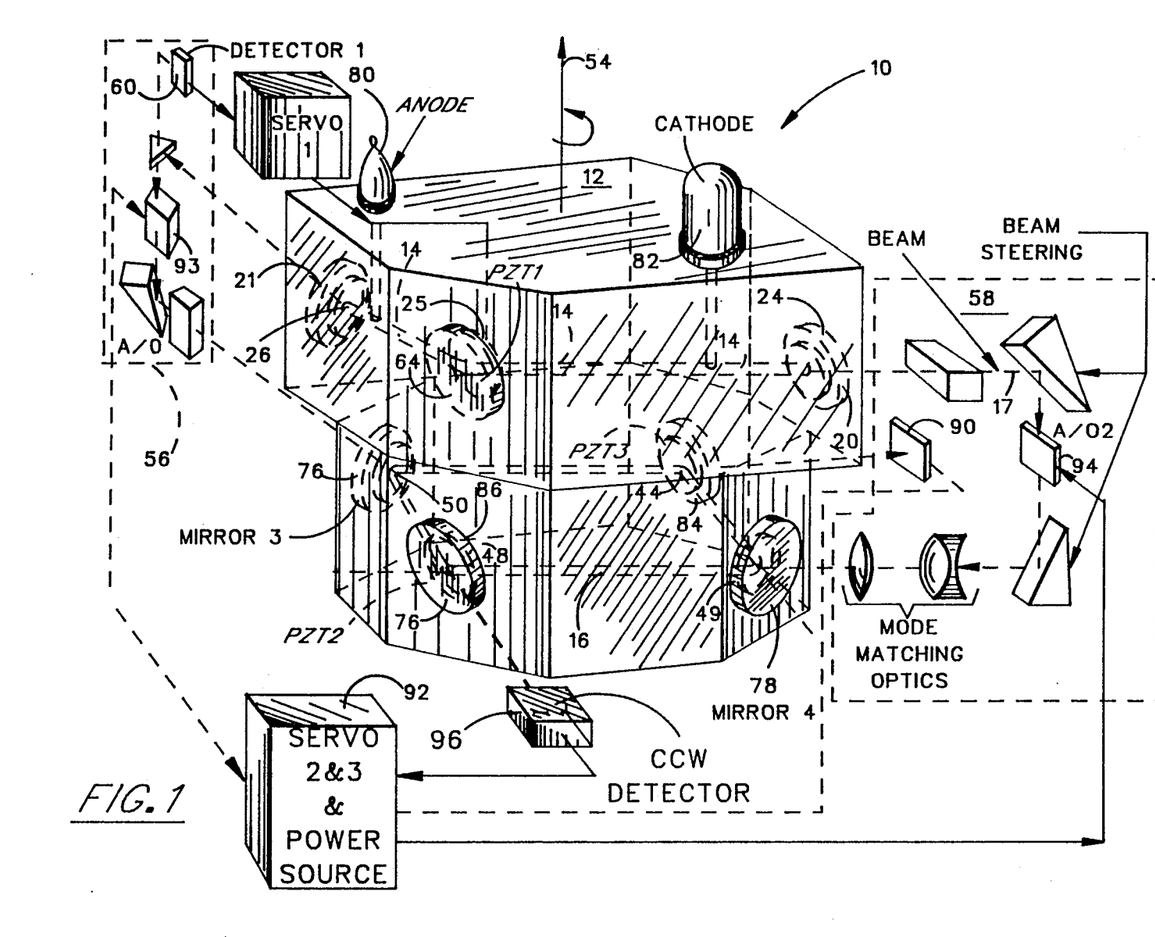
FIG. 1 is a prospective view of the passive ring resonator gyroscope.

Referring now to FIG. 1, an embodiment of the invention passive ring resonator gyroscope is depicted having a single piece body 12 having integral first and second resonator cavities 14, 16. The first cavity forms a standing wave laser, referred to as the linear laser. The output of the linear laser is not influenced by inertial rate inputs to the gyroscope.

The first resonator cavity 14 has a transmitting optical port means 20, 21 for transmitting stabilized single frequency light, and at least two internal body-mounted reflective surfaces such as partially transmissive mirrors 24, 26 and a mirror surface 25 on a piezoelectric transducer. Each reflective surface is coupled to and mechanically spaced by the body 12.

An appropriate gain medium, such as a mixture of Helium and Neon, is contained in the first resonator cavity.

Figure 6A:
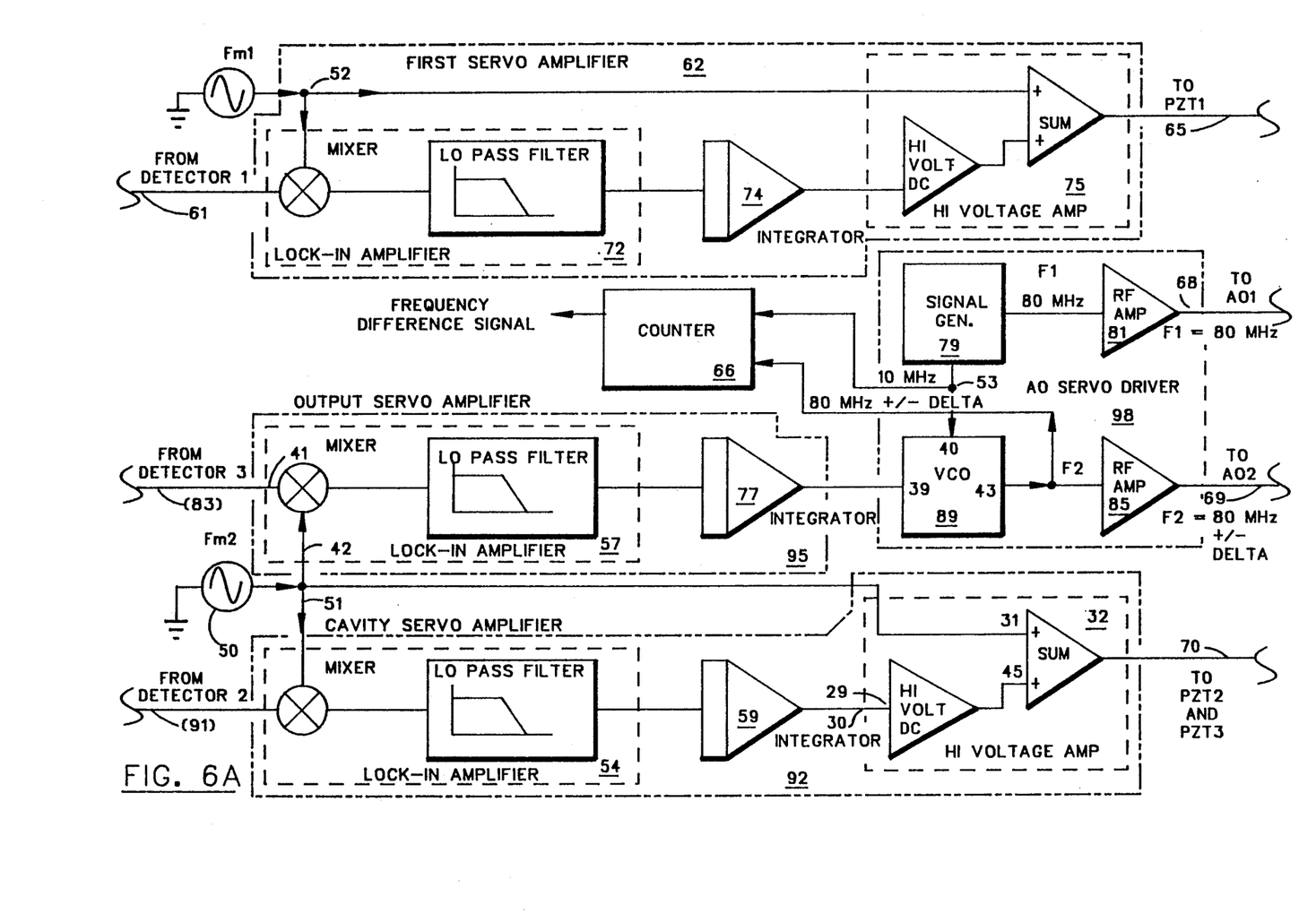
FIGS. 6A and 6B are a combination schematic and block diagram of the associated electronics and optical elements of the passive ring resonator gyroscope.
Figure 6B:
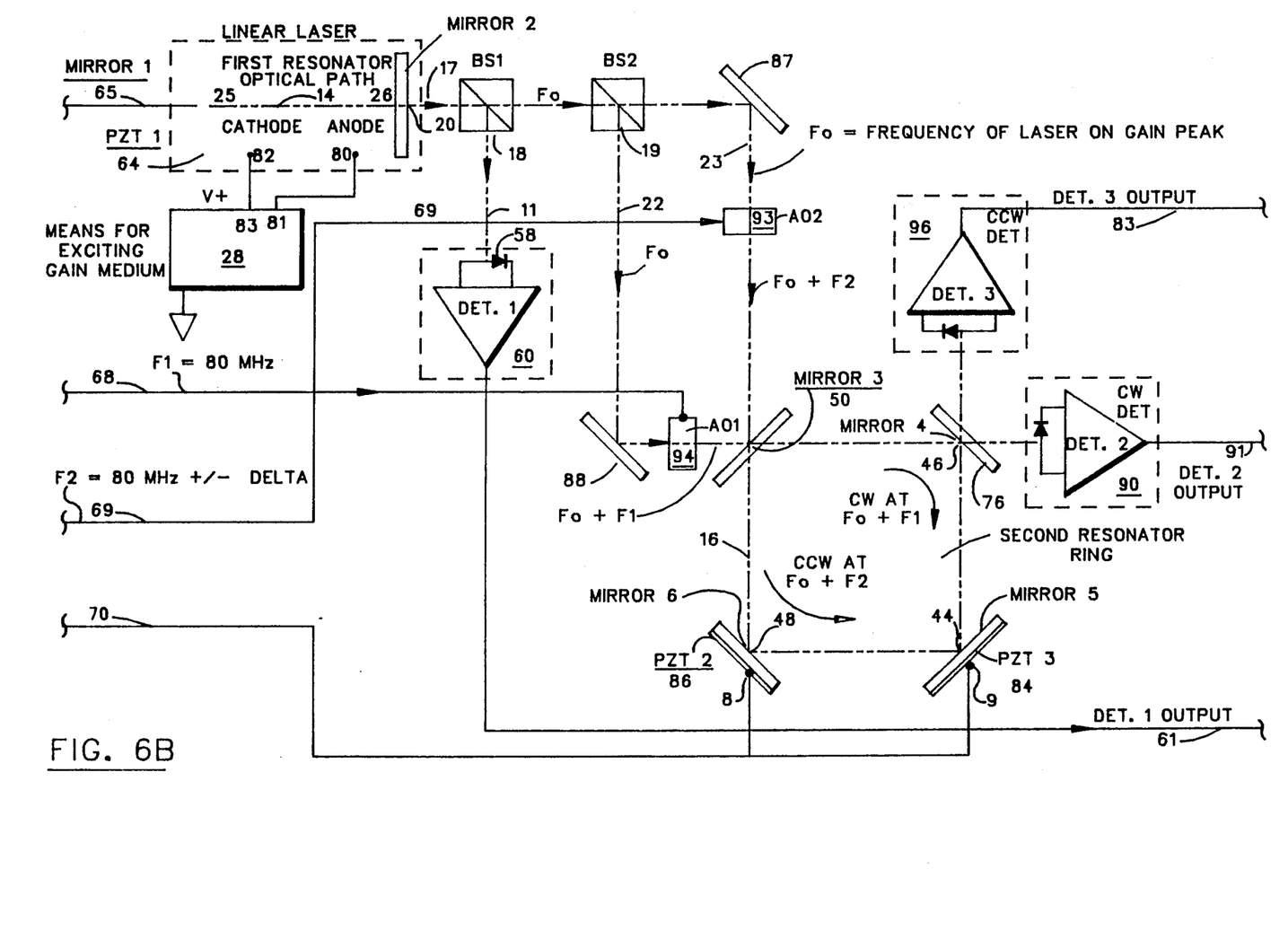

Referring to FIG. 6B block 28 represents a means for exciting the gain medium to induce lasing in the first resonator cavity. This element would also be included in the embodiment of FIG. 1. Referring to FIG. 1, the single frequency light, represented by phantom line 17, is shown directed through the first resonator transmitting optical port means 20. Beamsteering optics couple the single frequency light to the second resonator's clockwise beam entry at MIRROR 4, 78.

In FIG. 1, the ring resonator cavity 16, the second cavity, is depicted as having a receiving optical port means, such as MIRRORS 76, 78 for receiving stabilized single frequency light. The second resonator has at least three reflective surfaces such as those designated by reference numbers 44, 46, 48, 50, that form a closed optical path and enclosing an area. The passive ring resonator gyroscope sensitive axis 54 is normal to the plane of the enclosed area.

The FIG. 1 phantom blocks 56 and 58 represent a means for beamsteering the single frequency light as it exits the first resonator cavity transmitting port means 20, 21 to the second resonator cavity receiving optical port means, such as MIRRORS 76 and 78. The first and second resonator cavities induce output signal frequency bias errors in response to body dimension changes.

A first resonator tuning means is represented in the alternative embodiment of FIGS. 6A and 6B by elements such as Beamsplitter 18, DETECTOR 1, 60, FIRST SERVO AMPLIFIER 62 and PZT 1, 64, is characterized to adjust the optical path length of the first resonator to frequency stabilize the light to its intensity peak. The phrase "frequency stabilization" is understood to mean phase sensitive detecting and servo locking the laser output to its intensity peak.

The second resonator cavity 16 is characterized as being positioned and dimensioned in relation to the first resonator cavity to experience relatively equivalent optical path length changes in response to the induced body dimension changes.

Elements designated by reference numbers 84, 86, 90, 92, 95, 96, 98 inclusive, represent a means for detecting a change in second resonator output frequency in response to rotation of the single piece body about the sensitive axis and for providing an output signal.

Bias errors relating to temperature induced body dimension changes or to changes from external body forces, such as those transmitted to the body 12 via shock mounts, are cancelled thereby providing enhanced stability.

In another more particular alternative embodiment of the passive ring resonator gyroscope, the means for exciting the gain medium to induce lasing in the first resonator cavity to provide a stabilized single frequency light source further comprises at least one anode, such as anode 80, at least one cathode, such as cathode 82, and a current source means block 28, such as that shown in FIG. 6B. Block 28 is powered from a voltage source such as V+ with respect to a reference potential such as ground, having a current source terminal 81 and a return terminal 83 for coupling a controlled current from the current source terminal 81 to the anode means 80, through the gain medium (not shown) to induce lasing, to the cathode means 82 and thence to the current source return terminal 83. In a typical Helium-Neon laser, it is customary to reference the anode to a potential at or near ground and to drive the cathode from a high negative potential source.

FIGS. 6A and 6B, show an alternative embodiment of the passive ring resonator gyroscope in which the first resonator tuning means has a means responsive to the single frequency light for providing optical excitation, such as partially transmissive MIRROR 2, 20 and BEAMSPLITTER BS1, 18. The current source means 28, and the first resonator optical path between mirrored surfaces 25 and 26, and a gain medium such as a mixture of Helium and Neon gas within the sealed first resonator 14 function to provide the single frequency light source to partially transmitting MIRROR 2, 20. Beamsplitter BS1, 18 provides the optical excitation from the linear laser as beam 11 incident on Detector 1, 60 at photodiode 58.

DETECTOR 1, 60 represents a first servo means responsive to the optical excitation from MIRROR 2 for detecting the intensity of the first resonator single frequency light source and also provides an optical path length control signal via control line 61 and first servo amplifier 62 to control line 65 to PZT1, 64 which is used to intensity, and therefore provides single frequency light leaving the first resonator cavity 14 at MIRROR 2, 20.

PZT1, 64 represents a means responsive to the optical path length control signal for changing the first resonator's optical path length between reflective surfaces 25 and 26 to maximize the intensity of the single frequency light leaving the first resonator transmitting optical port 20 through the transmitting optical port means, such as through partially transmissive MIRROR 2.

The alternative embodiment of FIGS. 6A, 6B provides a passive ring resonator gyroscope in which the transmitting optical port means 20 couples the single frequency light source to a beamsplitting and beamsteering means to provide the first and second stabilized single frequency light sources. The first and second beams are the counterpropagating CW and CCW beams in the passive cavity. The means for beamsteering is characterized in FIG. 6B as beamsplitter BS2 and MIRRORS 87, 88. The beamsplitter BS2, receives the single frequency light source and provides the first and second single frequency light source beams 22, 23. FIG. 6B characterizes the convention of clockwise and counterclockwise beams. The means for beamsteering couples the first and second single frequency light sources characterized by phantom lines CW 22, CCW 23 into the second resonator cavity 16 to provide clockwise and counterclockwise beams respectively within the second resonator's closed optical path.

In the alternative embodiment of FIGS. 6A, 6B, the second resonator cavity means for detecting a shift in frequency of the single frequency light further comprises a cavity servo means such as that represented by elements such as output coupling mirror surface 76; DETECTOR 2, 90; cavity servo amplifier 92; PZT 2, 86 and PZT 3, 84.

The cavity servo means is responsive to the intensity of the clockwise beam, such as 22, for adjusting the path length of the second resonator cavity 16 to maximize the on resonance intensity of the clockwise beam.

An output servo means is included and is represented by elements such as output coupling mirror surface 76; DETECTOR 3, 96; OUTPUT SERVO AMPLIFIER 95; AO SERVO DRIVER 98; and acousto-optic (AO) device AO2. The output servo means is responsive to the intensity of the counterclockwise beam 23 circulating in the second cavity resonator 16 for adjusting the frequency of the CCW (counterclockwise) beam, through use of a voltage controlled oscillator 89, to maximize the on resonance intensity of the counterclockwise beam. The frequency difference between the clockwise and the counterclockwise beams in the second cavity 16 provides a measure of the input body rate about the gyroscope's sensitive axis. Counter 66 shown in FIG. 6B, measures the output frequency of voltage controlled oscillator (VCO) 89 and is conveniently sampled by a computer at a predetermined sample rate.

Referring to FIG. 6B, in another alternative embodiment, the cavity servo means 90, 92, 86, 84 further comprises a partially transmitting mirror surface 76 functioning as a means responsive to the second resonator clockwise single frequency light beam for providing clockwise beam optical excitation.

DETECTOR 2, 90, operating with the first servo amplifier 92, represents a cavity servo amplifier means responsive to the clockwise beam optical excitation for detecting the intensity of the second resonator clockwise beam and for providing an optical path length control signal on control line 91 to maximize the intensity of the second resonator clockwise beam. By the phrase "detecting the intensity of the second resonator clockwise beam", we also mean to include the concept of positioning the DETECTOR and characterizing the control means to be responsive to a reflected intensity minimum. In the present embodiment, DETECTOR 2 is responsive to an intensity maximum.

Optical detector units (such as DETECTOR 1, 2 and 3, 60, 90 and 96) typically contain a reversed biased PIN diode and a low noise preamplifier. A detector such as the SD-00-12-12-231 manufactured by the Silicon Detector Corp. of Newbury Park, Calif. is suitable for use with a Helium Neon laser light source.

The elements within cavity servo amplifier phantom block 92 represent a means responsive to the clockwise beam optical path length control signal on control line 91 for changing the second resonator optical path length via PZT2, 86 and PZT3, 84 to maximize the on resonance intensity of the second resonator clockwise beam.

Partially transmitting MIRROR 4, 76 also represents a means responsive to the second resonator counterclockwise beam for providing optical excitation. DETECTOR 3, 96, OUTPUT SERVO AMPLIFIER 95 and AO SERVO DRIVER 98 represent a means responsive to the counterclockwise optical excitation for detecting the intensity of the second resonator counterclockwise beam and for providing a counterclockwise frequency control signal on control line 83 to AO2 to adjust the frequency of the second CCW single frequency light source.

The elements within OUTPUT SERVO AMPLIFIER, PHANTOM BLOCK 95 and AO SERVO DRIVER, PHANTOM BLOCK 98 represent an output servo amplifier means responsive to the counterclockwise frequency control signal for adjusting the frequency of the counterclockwise beam to maximize the intensity of the counterclockwise beam. The frequency of the counterclockwise beam is constantly adjusted by AO2 93 in response to the frequency control signal on line 69 to compensate for effective path length changes due to body rate inputs about the passive ring resonator gyroscope sensitive axis 54.

In another more particular alternative embodiment of the passive ring resonator gyroscope, the cavity servo amplifier means responsive to the optical path length control signal from DETECTOR 3 for adjusting the frequency of the counterclockwise beam to maximize the intensity of the counterclockwise beam by applying servo error signal to control line 69 further comprises: a dither clock signal source such as OSCILLATOR Fm2 50 applying a precision dither signal Fm2 at terminal 51.

A LOCK-IN amplifier means is represented by LOCK-IN AMPLIFIER 54 having a first input coupled to the optical path length control signal from DETECTOR 2 on control line 91, a second input responsive to the dither signal at terminal 51 for mixing and amplifying the optical pathlength control signal with the dither signal and for providing an amplified clockwise control signal.

An integrator means is represented by INTEGRATOR 59 having an input responsive to the amplified clockwise control signal for providing an integrated clockwise control signal.

A high voltage amplifier means to drive the electromechanical transducer is represented by the HI VOLT DC and the SUM elements within phantom block 32. The high voltage amplifier means has a first input coupled to the integrated clockwise control signal and a second input coupled to the dither signal source at terminal 51 for summing the integrated clockwise control signal with the dither signal to provide a buffered output control voltage at terminal 70.

The cavity servo amplifier means also includes at least one electromechanical transducer such as PZT2 and PZT3 mounted behind a reflective surface such as 48 and 44. The PZT's are used to adjust the second resonator's clockwise optical path length to maximize the clockwise beam intensity and have input terminals 8, 9 coupled to receive the buffered clockwise control signals from terminal 70.

The output servo amplifier means has a LOCK-IN amplifier means such as LOCK-IN AMPLIFIER 57 having a first input 41 coupled to the frequency control signal from DETECTOR 3 on control line 83 and a second input responsive to the dither signal at terminal 51 for mixing and amplifying the optical path length control signal with the dither signal and for providing an amplified frequency control signal.

An integrator means is represented by INTEGRATOR 77 having an input responsive to the amplified frequency control signal for providing an integrated frequency error signal.

The output servo amplifier means also includes an AO servo driver means depicted within phantom block 98 having a first input coupled to the integrated frequency error signal and having a signal generator for providing a predetermined reference frequency signal Fo such as the 80 MHz signal into RF AMP 81. F1 is chosen to be 80 MHz but can be any frequency that produces an optimum frequency shift using the AO modulators.

Several reference frequencies are defined in FIG. 6B. By the symbol Fo, we mean the frequency of the linear laser on the gain peak. By F1 we mean the frequency that AO1 is driven at to shift the frequency of the clockwise beam. The clockwise beam has a frequency of Fo+F1. By F2 we mean the frequency that AO2 is driven at to shift the frequency of the counterclockwise beam to achieve resonance. The CCW beam has a frequency of Fo+F2.

A voltage controlled oscillator (VCO) 89 is shown to be phase-locked to a 10 MHz reference signal 53 through input 40. The VCO has a center frequency at the predetermined reference frequency F1.

The voltage controlled oscillator input 39 is responsive to the integrated frequency control signal and provides a counterclockwise frequency signal at output terminal 43 shifted F2 from the predetermined reference frequency by a difference characterized by the integrated frequency error signal input at 39.

A first RF amplifier means represented by RF AMP 81 is responsive to the predetermined reference frequency signal F1 for providing a clockwise carrier drive signal at terminal 68. A second RF amplifier means represented by RF AMP 85 is responsive to the counterclockwise carrier frequency signal F2 for providing a counterclockwise carrier drive signal at terminal 69. A first acousto-optic modulator AO1, 94 is shown on FIG. 6B responsive to the clockwise carrier drive signal for shifting the frequency of the linear laser Fo at a frequency equal to the predetermined reference frequency signal F1.

A second acousto-optic coupler AO2, 93 is responsive to the counterclockwise carrier drive signal on control line 69 to shift the frequency of the linear laser Fo by F2.

A counter means 66 phased locked to the reference clock through 53 is provided to measure F2 and compare its value with the reference frequency F1 to determine the inertial rotation rate.

Each of the LOCK-IN AMPLIFIERS depicted in FIG. 6A functions to mix a dither signal, such as Fm1 or Fm2, typically near 1 kHz, depending on the channel, with a DETECTOR output signal that contains information at a corresponding Fm1 or Fm2 frequency. Using this synchronous demodulation or phase sensitive detection technique, information about the system can easily be obtained in high noise environments. Amplifiers of this type are sensitive to the phase relationship between the input information signal and the reference or dither signal to the lock-in amplifier. An in-phase information signal will provide an output response of one polarity and an out-of-phase relationship will result in an output signal of an opposite polarity. A typical LOCK-IN AMPLIFIER is the PRINCETON APPLIED RESEARCH Model 124A manufactured at Princeton, N.J. Amplifiers of this type, typically high Q DC amplifiers, provide a gain of several thousand at the reference or dither frequency and virtually no gain at other frequencies above or below the reference frequency. For an information signal of a fixed level, the amplifier typically provides a fixed DC level response at its output.

The output of the LOCK-IN AMPLIFIER 57 is fed to the input of INTEGRATOR 77. The output of the INTEGRATOR 77 provides an integrated error signal that is coupled to an input of the AO SERVO DRIVER 98. The INTEGRATOR 77 responds by integrating the output of the amplifier. A constant level out of the LOCK-IN will result in a constantly increasing or decreasing output from the integrator. The control loop is characterized to respond by driving the AO device as required to drive the information signal from DETECTOR 2 to zero.

The AO SERVO DRIVER 98 has RF AMP 81 and 85 with gains centered around F1. These amplifiers are characterized to typically operate at 80 MHz and to provide the required power level (typically 1 to 2 Watts) to AO1 and AO2 on control lines 68 and 69, respectively. SIGNAL GEN 79 provides an output of F1 MHz to RF AMP 81. It also provides the master clock from terminal 53 for all the clocks of the counter 66 and the VCO 89 to phase lock onto. The VCO output 43 is coupled to the input of RF AMP 85 and to the input of COUNTER 66. The VCO is characterized in this configuration to operate with a center frequency of F1. The VCO output varies in frequency by +/− DELTA as a function of its scale factor and the level of the signal from INTEGRATOR 77. DELTA is the variation of the CCW beam from the resonance of the CW beam in the passive cavity. The COUNTER 66 is characterized to provide a measure of the output frequency F2 driving AO2 and in this embodiment, this frequency is F1 +/− DELTA where DELTA is a measure of the body input rate to the gyroscope housing.

The CAVITY SERVO AMPLIFIER 92 has LOCK-IN AMPLIFIER 54, INTEGRATOR 59 and HI VOLT AMP 32. LOCK-IN AMPLIFIER 54 has a first input coupled to the output of DETECTOR 2 via control line 83 and a second input coupled to receive the output of the Fm2 oscillator from terminal 51. The operation of this LOCK-IN is essentially equivalent to that of LOCK-IN AMPLIFIER 57 discussed above. The output of LOCK-IN AMPLIFIER 54 is coupled to the input of INTEGRATOR 59. The output of INTEGRATOR 59 is coupled to input 29 of HI VOLT AMP 32. Input 31 of HI VOLT AMP 32 is coupled to receive the output of the Fm2 oscillator from terminal 51. The Fm2 oscillator input to HI VOLT AMP 32 operates as a low voltage level dither signal. The HI VOLT AMP 32 has a HI VOLTAGE DC AMPLIFIER capable of providing an output voltage of over 100 V needed to drive the PZT2 and PZT3 through the cavity resonances. This output is coupled to input 45 of a SUMMER. This SUMMER has a second input coupled to input 31. The SUMMER adds the dither signal on top of the output signal which drives PZT2 and PZT3.

HI VOLTAGE AMP 32 of FIG. 6A represents a high voltage amplifier means having an input coupled to the integrated error signal on terminal 30 for providing a buffered output control voltage on output drive line 70.

PZT2 and PZT3 86, 84 shown in FIG. 6B represent piezoelectric transducers. PZT2 and PZT3 each function as an electromechanical transducer, attached to reflective surfaces 48, 44 so as to adjust the second resonator optical path length. Each PZT has an input terminal coupled to a buffered output control voltage signal from the HI VOLTAGE AMP 32.

Figure 8:
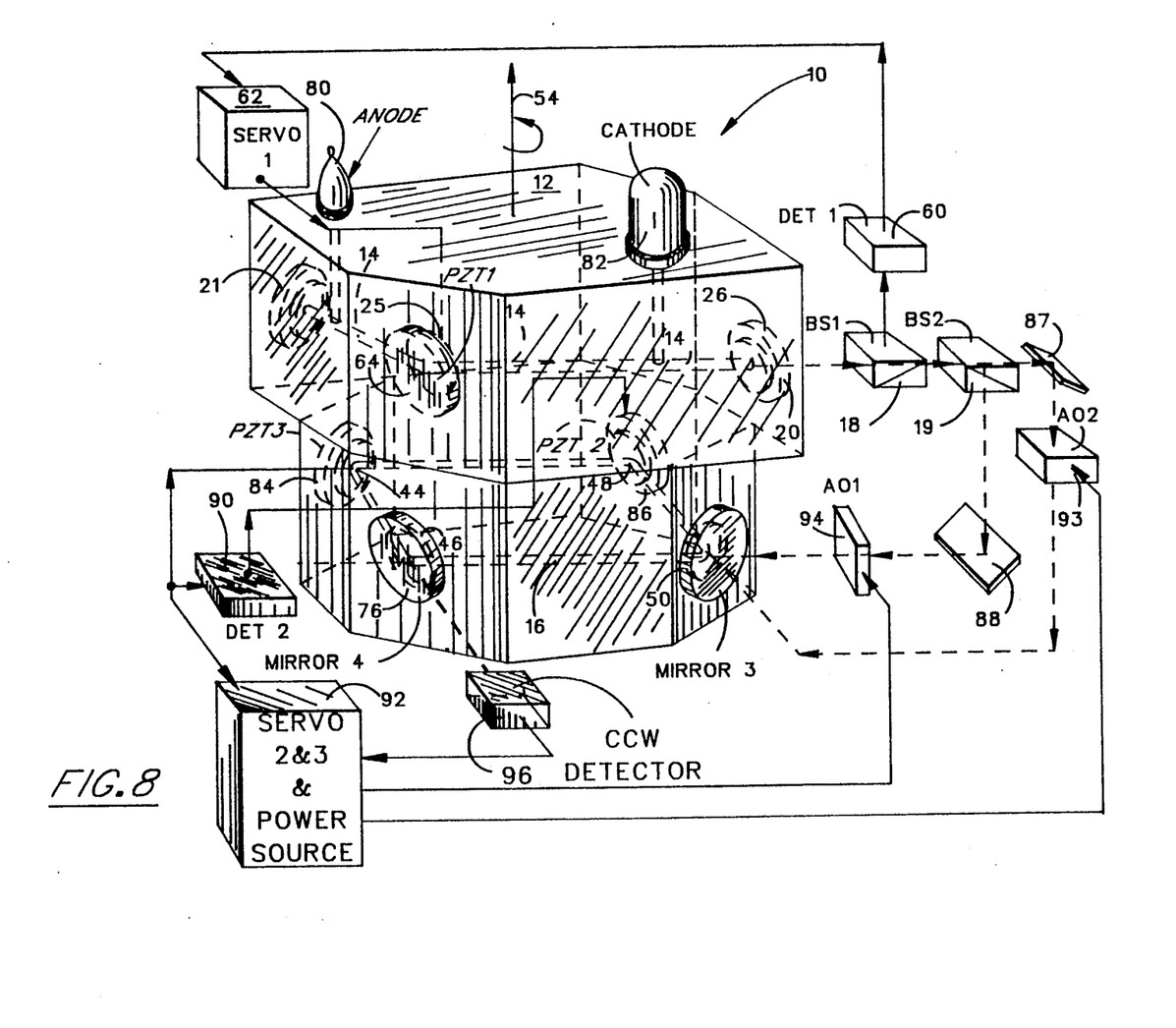
FIG. 8 is a perspective view of the passive ring resonated gyroscope with control components arranged as characterized in FIG. 6A and 6B.

FIG. 8 is a perspective view of the passive ring resonated gyroscope with control components arranged as characterized in FIG. 6A and 6B.

In alternative embodiments of this type, shown in FIG. 1, the first resonator cavity is characterized to form a straight or "L-shaped" or "U-shaped" linear laser. The manufacturability of the invention gyroscope is increased by the use of a straight linear laser.

Figure 2:
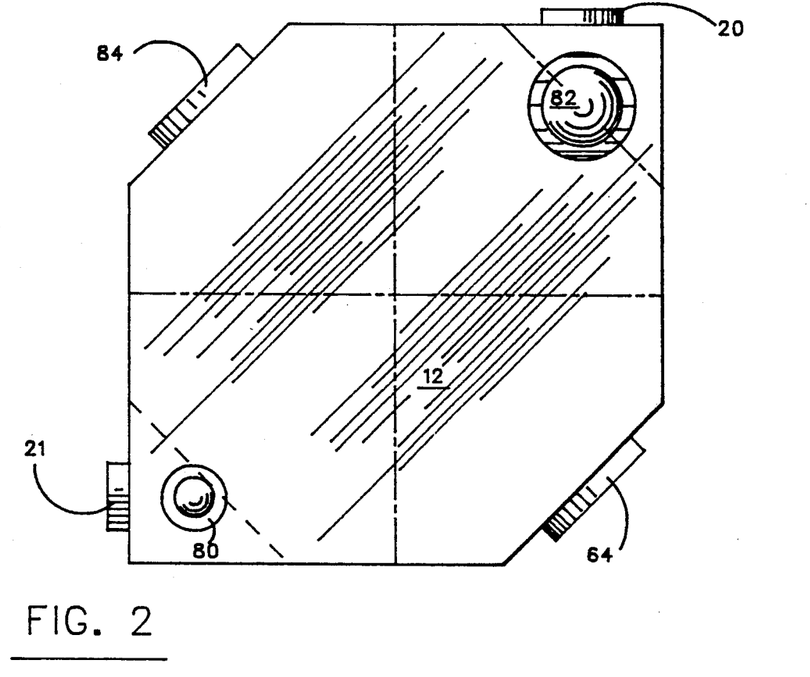
FIG. 2 is a top planar view of the passive ring resonator gyroscope body.

FIG. 2 is a top view of a preferred embodiment single piece body 12 showing partially transmissive mirrors 20 and 21. Single frequency light passes through these mirrors and is redirected by beamsteering optics to the passive cavity 16 (not shown). PZT1, 64 is a piezoelectric transducer having a mirrored surface at the corner of the first resonator cavity 14 for circulating light through the gain bore within the first resonator 14 (of FIG. 4 and FIG. 1).

Figure 3:
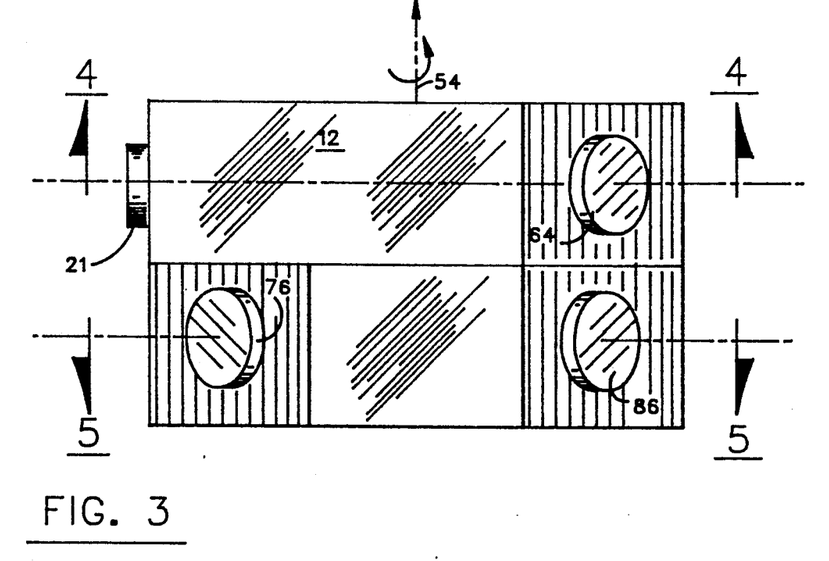
FIG. 3 is a front view of the passive ring resonator gyroscope body.

FIG. 3 shows PZT1, 64 on the surface of the passive ring resonator gyroscope body 10. Section lines 4—4 and 5—5 show the section line locations for FIGS. 4 and 5, respectively.

Figure 4:
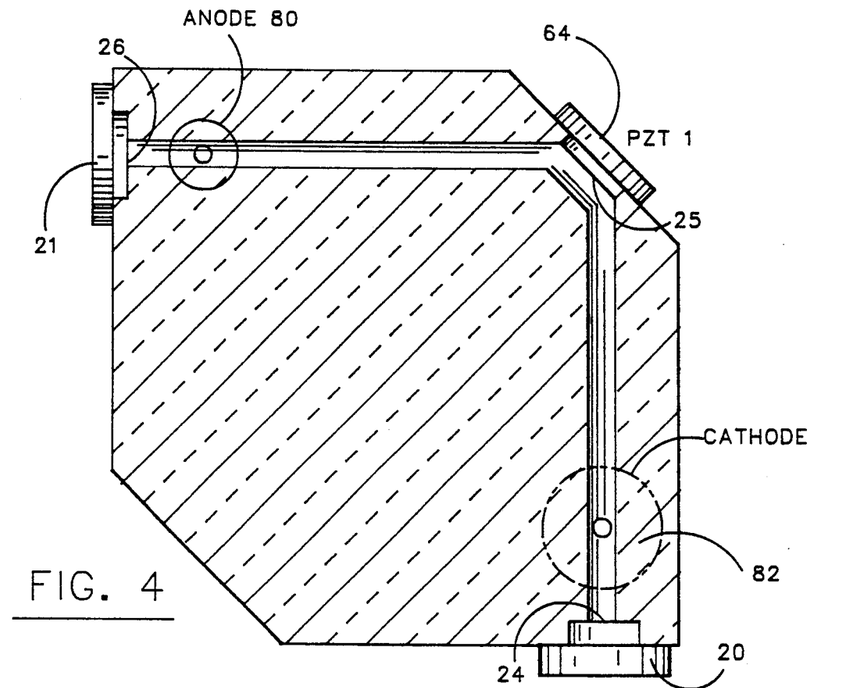
FIG. 4 is a sectional view of the passive ring resonator gyroscope body taken along sectional line 4—4.

FIG. 4 shows a sectioned view of the first resonator cavity 16 viewed from the bottom looking up.

Figure 5:
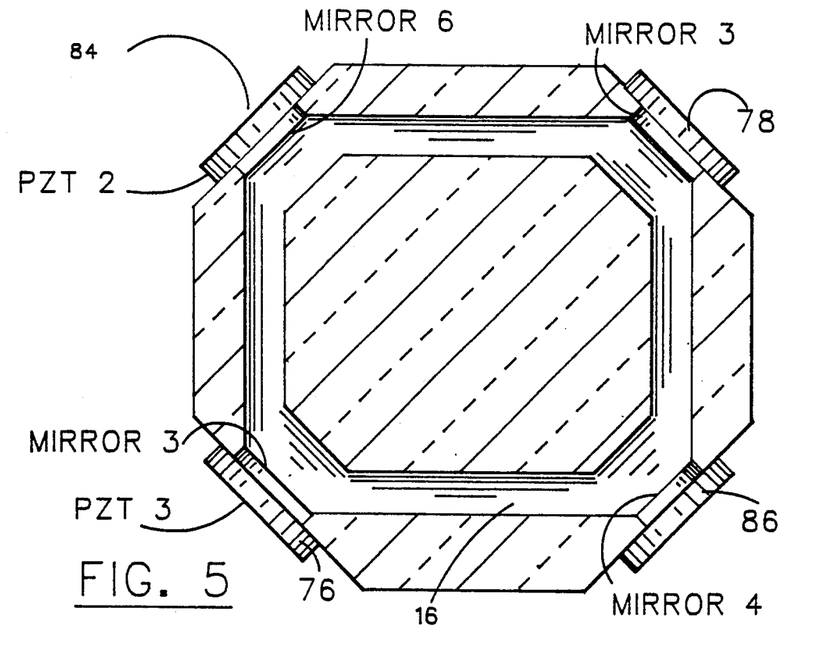
FIG. 5 is a sectional view of the passive ring resonator gyroscope body taken along line 5—5.

FIG. 5 shows a sectional view of the second resonator cavity viewed from the top looking down. The L-shape of the first resonator cavity in FIG. 4 is dimensioned and positioned in this embodiment to reside directly above the second resonator cavity of FIG. 5 and and to be essentially congruent with one half of the second resonator cavity and to experience relatively equivalent optical path length changes in response to induced body dimension changes such as those resulting from mechanical forces applied to the body or to those resulting from thermally induced strain.

Figure 7:
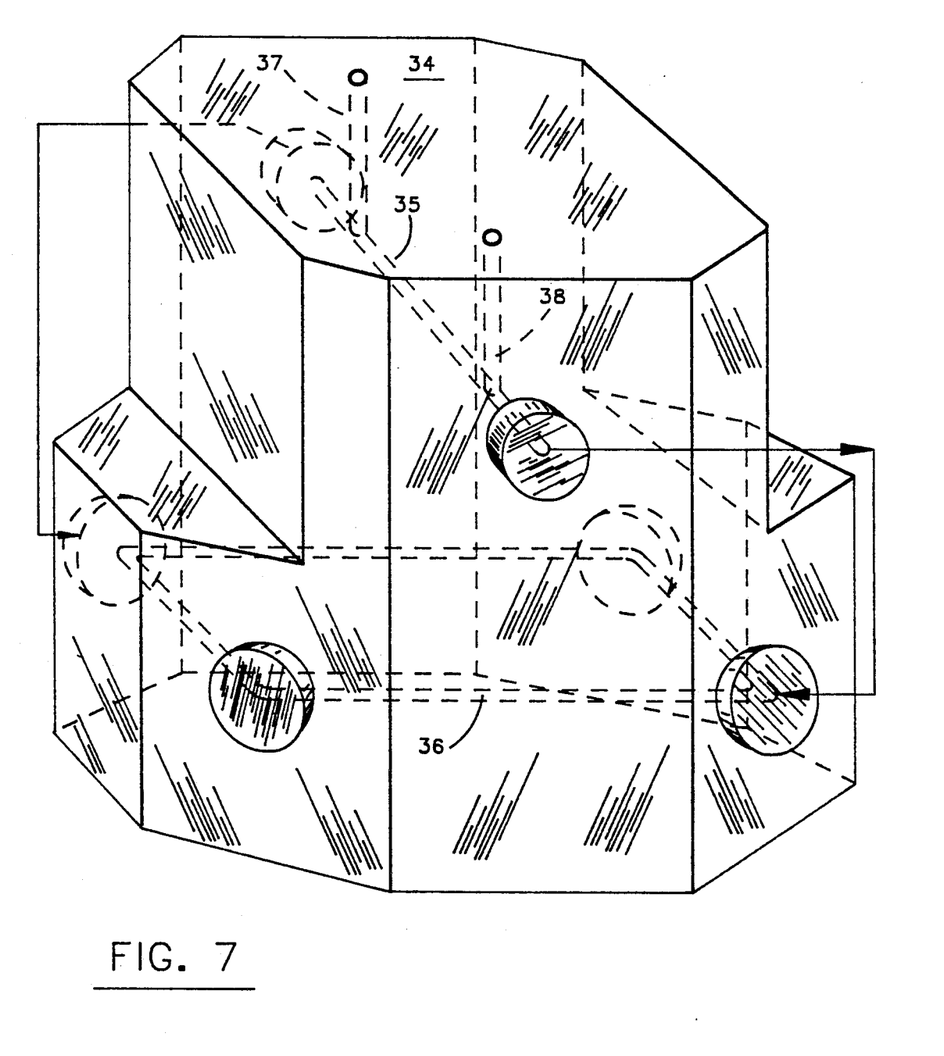
FIG. 7 is a schematic diagram of an alternative passive ring resonator gyroscope housing showing the use and positioning of a straight linear laser.

FIG. 7 represents another alternative embodiment of a body 34 for use in fabricating a more produceable passive ring resonator gyroscope. The configuration of body 34 includes a first cavity 35 for use as the gain bore for a linear laser. Vent holes 37 and 38 lead to anode and cathode locations on the top surface of the body 34. The second cavity 36 serves as a passive ring cavity.

The frequency of the free running linear laser 14 typically varies over a few MHz (megahertz). In this device, intensity stabilization control means being developed are expected to provide operation with a stability of a few hundred kilohertz.

The DETECTOR 1, 60 block is selected to have high gain and low noise. A slow dither or modulation frequency Fm is superimposed on top of the linear laser frequency Fo. The optical feedback signal from DETECTOR 1, 60 is demodulated by mixing it wit the reference Fm in the LOCK-IN amplifier. By choosing a suitable Fm, the LOCK-IN output will be a discriminator curve proportional to the slope of the gain curve or resonance signal. This discriminator curve is integrated to provide the compensating feedback + or − error control voltage to PZT1. The PZT changes the length of the cavity to maximize the output such that the detector output is zero and the cavity is locked on the top of the gain curve. This concept of frequency stabilization using frequency modulation and phase sensitive detection is used in the linear laser servo and in the cavity servo loops.

OPERATION

Due to the Sagnac effect, the path lengths of the clockwise (CW) and counterclockwise (CCW) beams in ring resonator differ as a function of body rotation rates. Consequently, the resonant frequencies for CW and CCW light in the passive cavity have a corresponding difference dependence. See Reference 2 on page 3 of this document. The goal of the optics and electronics of the Passive Ring Resonator Gyroscope (PRRG) is to detect the frequency difference that arises between the CW and CCW beams due to inertial rotations. The intent of the single body linear laser/passive cavity design is to eliminate bias errors caused by the resonant frequencies of the linear laser and passive cavity changing with respect to one another. In this single block, these bias errors will also be independent of input rotation rates. The two cavities are arranged mechanically and geometrically to insure that shifts in laser frequency arising from body dimensional changes are experienced by both the passive resonator cavity and the linear laser cavity and therefore reduce the effect of such bias errors.

To obtain such bias compensation, the Free Spectral Range of the first resonant cavity 14 is made equal to the Free Spectral Range of the second resonant cavity 16. The Free Spectral Range (F.S.R.)=c/p where c is the speed of light and p is the optical round trip pathlength of a resonator. Thus, the F.S.R. of a square passive ring resonator with sides of length L is c/4L. To meet the F.S.R. requirement, two cases arise contingent upon the linear resonator design. If the first resonator forming the linear laser is comprised of a mirror with no curvature, i.e. a flat mirror, and a mirror with a predetermined radius of curvature, i.e. a curved mirror, the required resonator length between mirrors is L. The F.S.R. of this flat mirror, curved mirror resonator equals c/4L. However, a resonating using two curved mirrors requires a resonator length between mirrors equal to 2L. This configuration also has a F.S.R. equaling c/4L. With the criteria $(F.S.R)_{Laser} = (F.S.R.)_{Passive\ Resonator} = c/4L$, it is apparent that any change in the F.S.R. of the laser resonator will equal any change in the F.S.R. of the passive ring resonator which may arise from thermal or mechanical changes.

Cavity Servo

Mirrors with piezoelectric (PZT) backings supply a modulation means to the passive resonator cavity; this modulation effects both the CW and CCW beams. This modulation or dither frequency Fm is a sinusoid typically 1 kHz.

Light leaving the passive cavity from the CW direction is detected and phase sensitive demodulated by employing a lock-in amplifier. The error signal from this operation drives a piezoelectric mirror in the passive cavity bringing the CW beam into resonance. In the preferred embodiment depicted earlier, the DC error signal and the modulation signal Fm are summed and applied to a single PZT. The bandwidth of the gyroscope is limited by the PZT in this servo loop.

Acousto-Optics

Each counterpropagating beam encounters a non-linear optical device which shifts the frequency of the input light. The AO devices are typically made up of a piezoelectric transducer attached to a crystal The AO device is fabricated from a piezoelectric crystal material such as quartz, $TeO_2$ (Telurium Dioxide) or $PbMoO_4$ (Lead Molybdate). In the preferred embodiment, the transducer, driven at F1, establishes an acoustic wave F1 in the crystal. Associated with the acoustic wave is a varying index of refraction due to the compressions and rarefactions of atomic density in the crystal. Incoming light diffracts off this induced grating giving rise to many orders of diffracted beams. The 0th order beam is at the frequency of the incoming light, Fo; the first order beam has the frequency Fo+Fs, where Fs is the frequency of the acoustic wave. The output from the AO device has the discrete frequencies Fo+nFs where n=0,1,2 . . . each separated in space by an angle proportioned to n. Thus, we see that by shifting the AO wave frequency by 1 Hz, we can add 1 Hz the frequency of the first order beam exiting the AO device. (See e.g., *Optical Waves in Crystals*, A. Yariv & P. Yeh (John Wiley & Sons)

AO Servo

The acousto-optic device is an essential element in the output servo loop. CCW light is detected and phase sensitive demodulated producing a dc error signal. A voltage controlled oscillator (VCO) receives this error signal and outputs a sinusoid whose frequency is related to the input rotation rate. Specifically, the output servo alters the frequency of the light supplied to the CCW via an AO2 beam path bringing that light into resonance. The VCO output is also inputted into a counter supplying the gyro output.

Common Mode

Two acousto-optic devices are used so each beam encounters similar phase shifts. AO2, driven by the VCO, typically shifts the light by F1 plus or minus a frequency related to the input rotation rate; AO1 in the CW beam path driven by the signal generator shifts the CW light by F1. By passing the CW light through an acousto-optic device, common mode bias errors are eliminated with respect to the CCW beam.

Although the invention has been disclosed and illustrated in detail, it is to be clearly understood that the same is by way of illustration as an example only and is not to be taken by way of limitation. The spirit and scope of this invention is to be limited only by the terms of the appended claims.

What is claimed is:

1. A passive ring resonator gyroscope 10 having enhanced stability and sensitivity and having a sensitive axis responsive to an input body rotation rate comprising:

a single piece body having an integral first and second resonator cavity;

said first resonator cavity having a laser means for providing a single frequency light source to said second resonator cavity, said single frequency light source being shifted in frequency by changes induced in the optical path length established by induced body dimension changes changing the spacing between said first cavity internal mounted reflective surfaces, said second resonator cavity being a passive high Q evacuated cavity having a closed second optical path tuned to resonate at said light frequency of said first resonator cavity, said sensitive axis being essentially normal to the plane of said closed second optical path, means for coupling said single frequency light from said first to said second resonator cavity, said second resonator cavity being dimensioned in relation to said first resonator cavity to have substantially equivalent optical path length changes in response to said induced body dimension changes, cavity servo means for controlling the resonant frequency of said second resonator high Q cavity to simultaneously and substantially track the resonant frequency of said first resonator high Q cavity, output servo means for detecting the change in frequency of said single frequency light within said second resonator in response to said body rate input to said sensitive axis and for providing an output signal, said output signal being relatively free of induced body dimension change frequency bias error;

whereby, bias errors relating to temperature induced body dimension changes or to changes from external forces applied to said body are cancelled providing a passive ring resonator gyroscope having enhanced stability.

2. The passive ring resonator gyroscope of claim 1 wherein said first resonator cavity further comprises:
- at least one transmitting optical port for transmitting stabilized single frequency light, said first resonator internal body-mounted reflective surfaces being coupled to and mechanically spaced by said body,
- a gain medium contained in said first resonator cavity;
- means for exciting said gain medium to induce lasing in said first resonator cavity to provide a stabilized single frequency light source, said single frequency light source being directed through said first resonator transmitting optical port;
- laser servo means for sensing the intensity of said first resonator single frequency light source and for providing a path length control signal to maximize the intensity of light leaving said first resonator.

3. The passive ring resonator gyroscope of claim 2 wherein said single frequency light source is further characterized to provide said second cavity with a clockwise beam and a counterclockwise beam, and
- wherein said cavity servo means is further characterized to adjust the second cavity path length to compensate for input rate and to maximize the gain of said second cavity to said clockwise beam,
- said output servo means being further characterized to adjust the frequency of said counterclockwise beam to compensate for said input body and second cavity path length to maximize the gain of said second cavity to said counterclockwise beam;
- whereby the frequency difference between said clockwise and said counterclockwise beams a measure of said body rate.

4. A passive ring resonator gyroscope 10 having enhanced stability and sensitivity and having a sensitive axis responsive to an input body rotation rate comprising:
- a single piece body having an integral first and second resonator cavity;
- said first resonator cavity 14 having a transmitting optical port means for transmitting stabilized single frequency light, and at least two internal body-mounted reflective surfaces each reflective surface being coupled to and mechanically spaced by said body,
- a gain medium contained in said first resonator cavity;
- means for exciting said gain medium to induce lasing in said first resonator cavity to provide said stabilized single frequency light source, said single frequency light source being directed through said first resonator transmitting optical port means out of said first resonator;
- said second resonator cavity being evacuated and having:
- a receiving optical port means for receiving stabilized single frequency light; said second resonator having at least three reflective surfaces forming a closed optical path, said closed optical path enclosing an area, said passive ring resonator gyroscope sensitive axis being normal to the plane of said area;
- means for beam steering said single frequency light exiting said first resonator cavity transmitting port means to said second resonator cavity receiving optical port means;
- said first and second resonator cavities inducing output signal frequency bias error in response to body dimension changes;
- first resonator tuning means for adjusting the optical path length of said single frequency light source to make said single frequency light resonate within said first resonator cavity;
- said second resonator cavity being positioned and dimensioned in relation to said first resonator cavity to experience relatively equivalent optical path length changes in response to induced body dimension changes,
- means for detecting a shift in frequency of said single frequency light within said second resonator in response to rotation of said single piece body on said sensitive axis and to provide an output frequency signal control;
- wherein, bias errors relating to temperature induced body dimension changes or to changes from external forces applied to said body are diminished.

5. The passive ring resonator gyroscope of claim 4 wherein said means for exciting said gain medium to induce lasing in said first resonator cavity to provide a stabilized single frequency light source further comprises:
- at least one anode,
- at least one cathode, and
- current source means having a current source terminal and a return terminal for coupling a control current from said current source terminal to said anode means, through said gain medium to induce lasing, to said cathode means and thence to said current source return terminal.

6. The passive ring resonator gyroscope of claim 4 wherein said first resonator tuning means comprises:
- means responsive to said single frequency light for providing optical excitation;
- a first servo means responsive to said optical excitation for detecting the intensity of said first resonator single frequency light source and for providing an optical path length control signal to maximize the intensity of said single frequency light leaving said first resonator;
- means responsive to said optical path length control signal for changing said first resonator optical path length to maximize the intensity of said single frequency light leaving said first resonator transmitting optical port.

7. The passive ring resonator gyroscope of claim 4 wherein said transmitting optical port means is further characterized to couple said single frequency light source to beamsplitting and beamsteering means to provide first and second single frequency light sources, said means for beamsteering coupling said first and second single frequency light sources into said second resonator cavity to provide clockwise and counterclockwise beams respectively within said second resonator closed optical path.

8. The passive ring resonator gyroscope of claim 7 wherein said second resonator cavity tuning means further comprises:
- cavity servo means responsive to the intensity of said clockwise beam for adjusting the path length of said second resonator cavity to maximize the amplitude of said clockwise beam, and output servo means responsive to the amplitude of said counterclockwise beam for adjusting the frequency of said counterclockwise beam to maximize the amplitude of said counterclockwise beam;

whereby, the frequency difference between said clockwise and said counterclockwise beam provides a measure of said body rotation rate into said sensitive axis.

9. The passive ring resonator gyroscope of claim 8 wherein said cavity servo means further comprises:

means responsive to said second resonator clockwise single frequency light beam for providing clockwise beam optical excitation;

means responsive to said clockwise beam optical excitation for detecting the intensity of said second resonator clockwise beam and for providing an optical path length control signal to maximize the intensity of said second resonator clockwise beam:

cavity servo amplifier means responsive to said clockwise beam optical path length control signal for changing said second resonator optical path length to maximize the intensity of said second resonator clockwise beam.

10. The passive ring resonator gyroscope of claim 8 wherein said output servo means further comprises:

means responsive to said second resonator counterclockwise beam for providing optical excitation;

means responsive to said counterclockwise optical excitation for detecting the intensity of said second resonator counterclockwise beam and for providing a frequency control signal to adjust the frequency of said second stabilized single frequency light source;

output servo amplifier means responsive to said frequency control signal for adjusting the frequency of said counterclockwise beam;

whereby, the frequency of the counterclockwise beam is constantly adjusted to compensate for effective path length changes due to body rate inputs to said passive ring resonator gyroscope sensitive axis.

11. The passive ring resonator gyroscope of claim 9 wherein said cavity servo amplifier means responsive to said optical path length control signal further comprises:

a dither signal source;

a LOCK-IN amplifier means having a first input coupled to said optical path length control signal, a second input responsive to said dither signal for mixing and amplifying said optical pathlength control signal with said dither signal and for providing an amplified clockwise control signal;

an integrator means having an input responsive to said amplified clockwise control signal for providing an integrated error signal;

a high voltage amplifier means having a first input coupled to said integrated clockwise control signal and a second input coupled to said dither signal source for summing said integrated clockwise control signal with said dither signal to provide a buffered clockwise control signal;

at least one electromechanical transducer having a reflective surface positioned to adjust said second resonator clockwise optical path length to maximize said clockwise beam intensity and having input terminals coupled to receive said buffered clockwise control signal.

12. The passive ring resonator gyroscope of claim 10 wherein said output servo amplifier means responsive to said frequency control signal further comprises:

a dither signal source;

a LOCK-IN amplifier means having a first input coupled to said frequency control signal, a second input responsive to said dither signal for providing an amplified frequency control signal;

an integrator means having an input responsive to said amplified frequency control signal for providing an integrated frequency control signal;

an AO servo driver means having a first input coupled to said integrated frequency error signal and having a reference signal generator for providing a predetermined reference frequency signal, a voltage controlled oscillator having a center frequency established by said predetermined reference frequency signal, said voltage controlled oscillator having an input responsive to said integrated frequency control signal for providing a counterclockwise carrier frequency signal shifted from said predetermined reference frequency by a difference characterized by said integrated frequency error signal;

a first RF amplifier means responsive to said predetermined reference frequency signal for providing a clockwise carrier drive signal having a frequency equal to said predetermined reference frequency signal, a second RF amplifier means responsive to said counterclockwise carrier frequency signal for providing a counterclockwise carrier drive signal;

a first acousto-optic coupler responsive to said clockwise carrier drive signal for modulating the frequency of the clockwise beam at a frequency equal to said predetermined reference frequency signal; and a second acousto-optic coupler responsive to said counterclockwise carrier drive signal for modulating the frequency of said counterclockwise beam at the frequency of said counterclockwise carrier frequency signal; and counter means responsive to said predetermined reference frequency signal and said counterclockwise carrier frequency signal for providing a carrier frequency difference signal.

13. The passive ring resonator gyroscope of claim 4 wherein the Free Spectral Range of said first resonator cavity is adjusted to be equal to the Free Spectral Range of said second resonator cavity.

14. The passive ring resonator gyroscope of claim 12 wherein said first resonator cavity is characterized to form a straight linear laser.

15. A passive ring resonator gyroscope 10 having enhanced stability and sensitivity and having a sensitive axis responsive to an input body rotation rate comprising:

a single piece body having an integral first and second resonator cavity;

said first resonator cavity 14 having a transmitting optical port means for transmitting stabilized single frequency light, and at least two internal body-mounted reflective surfaces each reflective surface being coupled to and mechanically spaced by said body, a gain medium contained in said first resonator cavity;

means for exciting said gain medium to induce lasing in said first resonator cavity to provide said stabilized single frequency light source, said single frequency light source being directed through said first resonator transmitting optical port means out of said first resonator;

said second resonator cavity being evacuated and having:

a receiving optical port means for receiving stabilized single frequency light; said second resonator having at least three reflective surfaces forming a closed optical path, said closed optical path enclosing an area, said passive ring resonator gyroscope sensitive axis being normal to the plane of said area;

means for beam steering said single frequency light exiting said first resonator cavity transmitting port means to said second resonator cavity receiving optical port means;

said first and second resonator cavities inducing output signal frequency bias error in response to body dimension changes;

first resonator tuning means for adjusting the optical path length of said single frequency light source to make said single frequency light resonate within said first resonator cavity;

means for detecting a shift in frequency of said single frequency light within said second resonator in response to rotation of said single piece body on said sensitive axis and to provide an output frequency signal control;

wherein, bias errors relating to temperature induced body dimension changes or to changes from external forces applied to said body are diminished.

* * * * *